United States Patent [19]

Nicksic et al.

[11] Patent Number: 4,560,663

[45] Date of Patent: * Dec. 24, 1985

[54] WELL LOGGING METHOD USING ELECTRON SPIN RESONANCE SIGNALS FROM HYDROCARBON CRUDE

[75] Inventors: Stephen W. Nicksic, Brea; George W. Starke, Calistoga, both of Calif.

[73] Assignee: Chevron Research Company, San Francisco, Calif.

[ * ] Notice: The portion of the term of this patent subsequent to Nov. 15, 2000 has been disclaimed.

[21] Appl. No.: 507,428

[22] Filed: Jun. 23, 1983

Related U.S. Application Data

[63] Continuation of Ser. No. 202,045, Oct. 30, 1980, abandoned.

[51] Int. Cl.$^4$ .................. G01N 24/08; G01N 33/24
[52] U.S. Cl. ................................ 436/25; 324/316; 436/29; 436/173
[58] Field of Search ............... 436/173, 29, 30, 31, 436/60, 25; 324/300, 303, 316, 323, 324

[56] References Cited

U.S. PATENT DOCUMENTS

| | | | |
|---|---|---|---|
| 3,719,453 | 3/1973 | Erdman | 23/230 EP |
| 3,740,641 | 6/1973 | Hwang et al. | 23/230 EP |
| 4,415,671 | 11/1983 | Nicksic | 436/173 X |

OTHER PUBLICATIONS

Niizuma et al., *FUEL*, 1977, vol. 56, Jul., pp. 249-256.
Yen et al., Analytical Chemistry, vol. 34, No. 6, May 1962, pp. 694-700.

*Primary Examiner*—Arnold Turk
*Attorney, Agent, or Firm*—Edward J. Keeling

[57] ABSTRACT

A well logging method is disclosed for identifying the presence of crude petroleum within subsurface earth formations by detecting electron spin resonance signals along a well bore and identifying crude petroleum as the source of those signals by enhancing and/or suppressing the signal by the presence of a chemical. Electron spin resonance signals from crude oil are enhanced by the presence of iodine and suppressed by the presence of ferric chloride.

13 Claims, 4 Drawing Figures

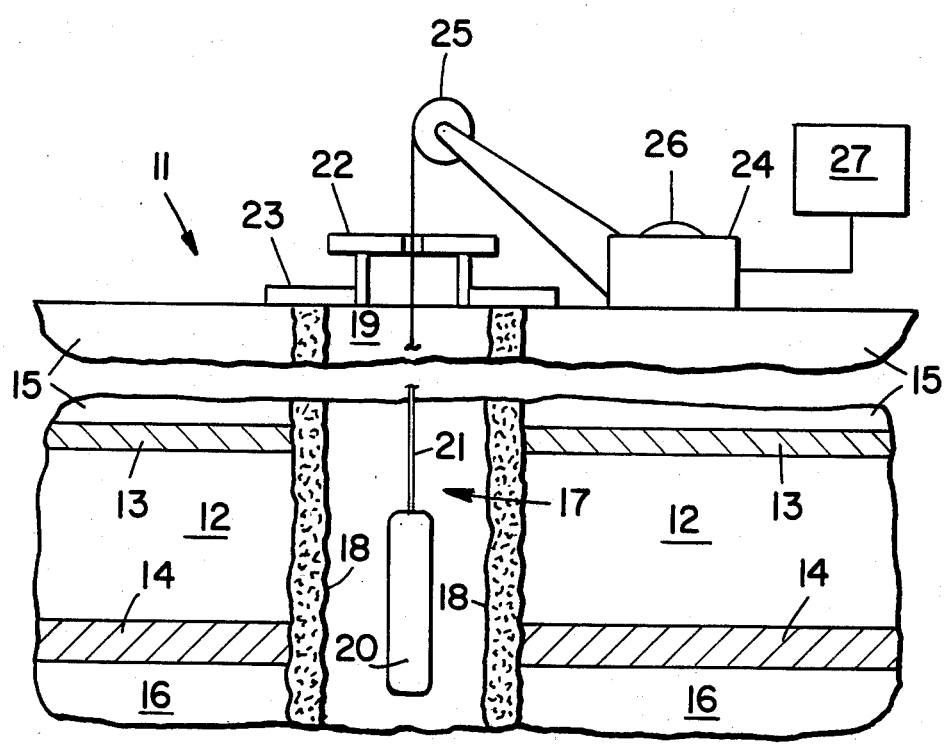
FIG_1
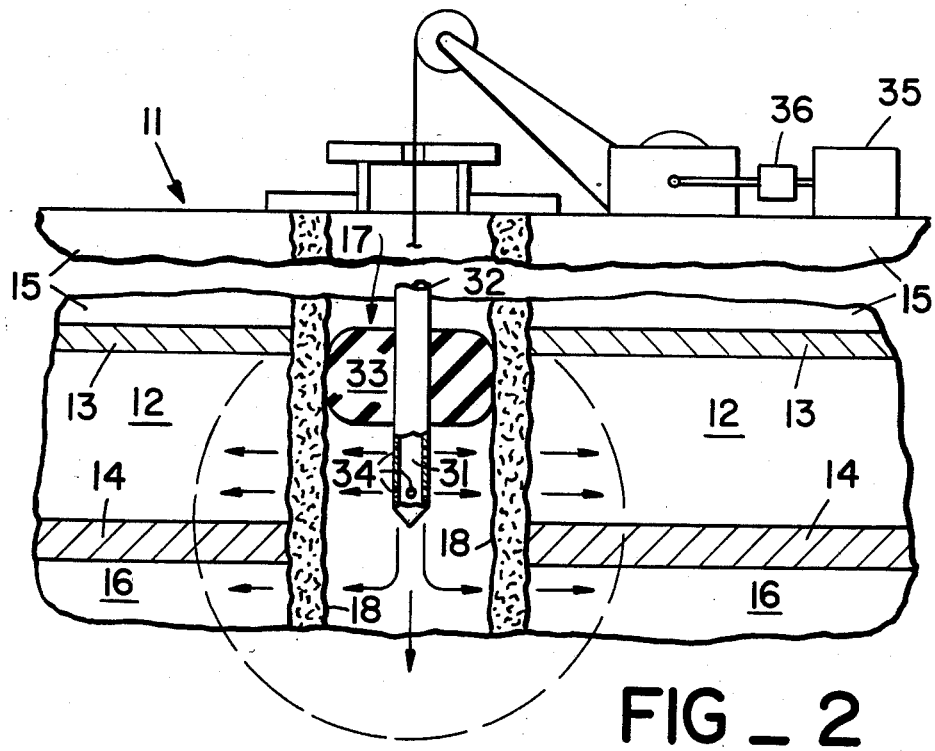
FIG_2

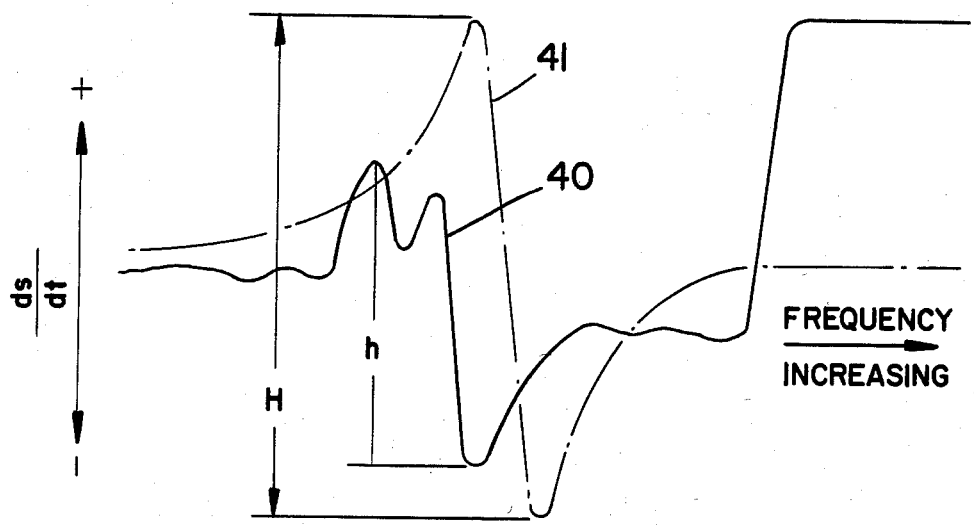
CRUDE OIL/ENHANCED CRUDE OIL
FIG_3
REFINED PRODUCT
NO EVIDENCE OF ENHANCEMENT
FIG_4

WELL LOGGING METHOD USING ELECTRON SPIN RESONANCE SIGNALS FROM HYDROCARBON CRUDE

This is a continuation of application Ser. No. 202,045, filed Oct. 30, 1980, now abandoned.

BACKGROUND OF THE INVENTION

1. Field of the Invention

This invention relates to the location of carbonaceous materials or materials geologically associated therewith. More particularly, it relates to the location of subterranean geological deposits of carbonaceous materials or materials geologically associated therewith, such as subsurface earth formations often referred to as source formations. By "carbonaceous materials" as used herein is meant petroleum, coal, natural bitumens, including tars and asphalts, partially carbonized animal and vegetable matter and carbonaceous geological deposits and formations including oil-bearing shales. Further, this invention relates to a method for distinguishing crude petroleum carbonaceous materials from coal or shale carbonaceous materials on subsurface earth formation materials.

2. Prior Art

Prior to this invention, there has been no practical way of directly detecting the presence of very small quantities of carbonaceous materials on subsurface earth formation materials. Further, if small quantities of such materials were detected, there was no practical way of positively distinguishing within such detected carbonaceous materials those materials which are crude petroleum based materials. Various methods are known for detecting the presence of carbonaceous materials, including, in increasing order of sensitivity, stain chemistry (adding chemicals to a sample to detect a change in color when carbonaceous materials are present); distillation treatment (as in chromatography where the presence of distillation fractions are detected); fluorescence (the irradiation with selected wave length electromagnetic energy to cause certain constitutents to fluoresce); and nuclear or electron spin resonance (the detection of the presence of atomic constituents of the carbonaceous materials). The most sensitive of the foregoing techniques is electron spin resonance (ESR) where the presence of unpaired electrons in atomic structures are identified by subjecting samples of the structures to controlled magnetic and electromagnetic fields.

With the use of prior art ESR techniques, it is possible to detect the presence of very small traces of carbonaceous materials; however, it is not possible to distinguish the type of carbonaceous material, i.e., crude petroleum, coal, tar sand or shale, from which the ESR signals were derived. ESR signals from geological materials may be attributable to a number of carbonaceous materials, both natural and refined, thus further confusing the attempt to identify a carbonaceous material.

The present invention uses ESR plus techniques for distinguishing the ESR signal of crude petroleum based natural carbonaceous materials as a method for detecting the presence or past presence of such materials in a well logging method.

SUMMARY OF THE INVENTION

Subsurface accumulations of crude oils are sometimes overlooked because the accumulations are contained in formations that maintain a tight binding to the crude. In other accumulations, the crude is of such a viscosity that it does not flow from the formation under the temperatures and pressures existing in the formation. In such cases the presence of subsurface crude may not be shown at the surface as a well is being drilled. In other subsurface accumulations, the crude is contained in thin layered formations separated and isolated from each other so completely that production of crude from one layer does not include production from other layers. In each of these conditions, it is important to determine the location of these subsurface deposits and it is desirable to develop information about the particular crude at the earth's surface while the crude is still at the subsurface location.

Techniques for collecting the desired information, by methods known as well logging, involve moving an instrument of various types along the well bore while collecting information about the formations and recording the information with respect to depth along the well bore. Frequently, the information accumulated by such well logging techniques is information that indirectly relates to the desired information, i.e., the information may be electrical resistivity of the formation, or porosity of the formation or geological information, all of which are interpretable to predict the presence of crude, but none of these are direct indications of the presence of crude. It is desirable to have a direct indication of the presence of crude, as for instance, a signal from the crude or a constituent of the crude.

The present invention provides a method for deriving information directly from crude oil, even to the extent of minute traces of hydrocarbon or carbonaceous materials on the surfaces of formation materials, so that an interpretation may be developed concerning the possibility that crude oil is present in or has passed through the formations being logged.

An object of the present invention is a well logging method for identifying the presence of crude petroleum even where minute quantities of hydrocarbon constituents have been retained on a subsurface formation. The method is accomplished by measuring electron spin resonance signal from the crude through techniques that eliminate the effect of the formation on the electron spin resonance signals. The method further includes techniques whereby the electron spin resonance signal is enhanced as a result of the introduction of materials into the formation. Another form of the method involves the introduction of a material that suppresses the electron spin resonance signal from crude oil.

A further object of the present invention is a method for distinguishing crude oil materials within a subsurface formation by the process of measuring electron spin resonance signals and the resultant enhancement of such electron spin resonance signals through the introduction of materials into the formation.

Further objects and features of the present invention will be readily apparent to those skilled in the art from the appended drawings and specification.

BRIEF DESCRIPTION OF THE DRAWINGS

FIG. 1 is a cross-sectional view through a well bore penetrating an earth formation illustrating a possible well logging tool and a formation upon which measurements of the type described in this invention might be performed.

FIG. 2 is a cross-sectional view through a well bore penetrating an earth formation illustrating schemati- FIG. 3 is a time vs. signal strength curve illustrating electron spin resonance signals from crude oil produced in accordance with the present invention.

FIG. 4 is a time vs. signal strength curve of electron spin resonance signals measured from refined petroleum products and measured in accordance with the techniques of the present invention.

DETAILED DESCRIPTION OF THE DRAWINGS

FIG. 1 is a representative cross-sectional view through an earth formational 11 and illustrates, schematically, one possible subsurface configuration where the present invention might be useful. In this illustration, a possible source formation 12 is located between nonsource formations 13 and 14 and all of these formations are covered by an overburden 15. A lower formation 16 may also be a possible source formation.

A well 17 is drilled through the earth formation 11 so as to penetrate each of the formations 12, 13, 14 15 and 16. Mud cake 18 is deposited from the drilling mud 19 along the face of the well bore at the interface with the formations as the well was being drilled. A well logging sonde 20 is shown suspended within the well 17 on a cable 21 entering at the well through bushing 22 in the well head 23. The sonde 20 is elevated or lowered through operation of cable hoist 24. Cable 21 passes over pulley 25 and is wound on drum 26 at the hoist 24. An electrical connection is provided through the Cable 21 between the sonde 20 and a sonde recording and control mechanism 27.

FIG. 2 illustrates the same earth formation 11 and well 17 with an injector tool 31 in position adjacent to the formations. The tool is suspended on tubing 32 which may be flexible so as to pass through bushing 22, over pulley 25 and onto the drum 26 operated by hoist 24. Within the well a packer 33 is positioned above the injector tool 31 so as to isolate the injected materials to formations below the packer. The packer may be operated from the well head though connectional mechanisms not herein shown. An additional packer placed and operated by mechnanism not shown, may be provided below the injector tool 31 to further select formation along the well bore.

The injector tool 31 has perforations 34 through the outer walls thereof through which materials may be injected into the well bore and, with pressure control, through the mud cake 18 and into the formations such as 12 and 16.

At the earth's surface a source of injection materials is provided at 35 connected through pump 36 to the hoist mechanism 24 and tubing 32. The pump 36 provides the necessary pressure to accomplish injection of the materials into the formations through the injector tool 31.

It should be understood that the mechanism and formations here illustrated are merely representative and that other configurations could be employed to accomplish the desired results as contemplated with this invention.

In accordance with the present invention, the presence of crude petroleum within a subsurface formation is detected by measuring electron spin resonance signals from the atomic structure of the crude. It is known that electron spin resonance signals may be measured from the unpaired electrons existing in crude oils. It is also known that these signals may be measured from such electrons in the crude while the crude remains in place within a subsurface earth formation. In such measurements, the electron spin resonance signal is measured from the electrons as they precess in the earth's magnetic field. Such techniques have been described in U.S. Pat. No. 3,060,371, issued Oct. 23, 1962 to Jonathan Townsend for Geological Prospecting Process and Apparatus. That patent does not disclose the apparatus here shown and does not describe how subsurface electron spin resonance signals would be measured, but the patent does describe the scientific principles for the measurement of electron spin resonance signals. For the purpose of the present invention, the well logging sonde 20 and the control and recording mechanism 27 is of the type described in U.S. Pat. No. 3,060,371 and is capable of (1) producing the necessary alternating (or rotating) magnetic field at the resonant frequency of the unpaired electrons associated with crude oil, the magnetic field alternating or rotating within the subsurface formation at right angles to the unindirectional field which may be the earth's magnetic field, and (2) detecting the existence of resonance with the unpaired electrons in the subsurface formation. The control of the apparatus is accomplished from the earth's surface and the detected signals are transmitted up the logging cable for display and recording at the earth's surface.

In accordance with the present invention, subsurface formations that are suspected of containing petroleum crude are logged by performing those steps which should produce electron spin resonance from the crude within the formation. Where resonance signals are not detected or where the detected signals need further identification as to their source, the further steps of the present invention are performed to provide further information concerning the subsurface formation and the unpaired electrons therein.

One of the present inventors has discovered, and has described in a copending application, Ser. No. 202,102, filed Oct. 30, 1980, S. W. Nicksic, titled "Method for Modifying Electron Spin Resonance Signals From Hydrocarbon Crude" methods for distinguishing electron spin resonance signals of crude oil unpaired electrons from other possible unpaired electrons that could exist in a subsurface earth formation. It has been observed that electron spin resonance signals from crude oil may sometimes be masked by the formation materials within which the crude oil is found. The copending application discloses that certain materials may be introduced into a formation sample to remove the particular material effecting the resonance signal. The copending application also discloses that electron spin resonance signals from crude oil may be enhanced by the addition of a halogen, particularly iodine or bromine, to the crude sample. This enhancement does not occur with unpaired electrons in other carbonaceous materials such as coal, shale, or tar sands. Further, the enhancement is pronounced with the introduction of iodine.

The copending application also discloses that electron spin resonance signals from crude oil can be suppressed in response to the introduction of ferric chloride to the crude oil exhibiting the resonance signal. The ferric chloride may be introduced in a benzene, toluene, xylene or carbon tetrachloride carrier.

In this application, the present inventors have applied their discoveries to a well logging method wherein the electron spin resonance signals are measured from subsurface earth formations and the materials they contain; then the formations, or selected formations, are subjected to the presence of additional materials which:

(1) overcome or remove the masking of electron spin resonance signals, (2) enhance the electron spin resonance signals from crude oil, (3) suppress the electron spin resonance signals from crude oil, or (4) combinations of the above procedures, followed by additional measurements of electron spin resonance from the formations, or the portions of the formations, and the recording of the initial and subsequent electron spin resonance signals as a means for interpreting the geology of the subsurface and identifying the presence of crude oil.

The foregoing steps are also useful in determining the presence of even minute quantities of hydrocarbon constituents, particularly asphaltenes, which may have been retained by the subsurface formations as crude oils passed through the formation.

Further, because the enhancement and suppression of electron spin resonance signals is only effective on most unrefined hydrocarbons, the presence of refined hydrocarbons as might be present when an oil base drilling mud was used in drilling the well will not deter from the effectiveness of the method when logging for subsurface deposits of crude oil. Electron spin resonance signals may be derived from heavy ends of refined products such as residuum or possibly from some heavy gas oils, but will not be derived from diesel, gas, butane or other light ends.

In accordance with the present invention, any of the aforementioned materials may be pumped down into the well bore with the apparatus schematically illustrated in FIG. 2. The packer 33 may be used above and/or below the injector tool 31 so as to isolate the injection into formations of particular interest. With knowledge of the porosity and permeability of the formation in interest, it is possible to adjust the pump pressure to effect the desired penetration into the formation. Electron spin resonance signals can be expected to be derived only from formation materials a reasonable distance laterally back into the formation (about a well bore diameter) therefore it is not necessary to inject a substantial amount of material to effect the desired result on the signal to be measured. On the other hand, because the entire formation can be expected to be represented by the materials at the well bore face and because the signals are derived from the hydrocarbon in place and not those introduced while drilling, the signals measured while logging the formation can be useful in both identifying the presence of crude oil and possibility that the crude can be produced from the formation.

The electron spin resonance signals measured from the formation materials are selected in a particularly narrow energy band width that represents the potential signals from asphaltenes and resin constituents of crude petroleum. These materials are present in substantially all crudes and are the residual material that is left behind as a crude petroleum migrates through a formation. While the selected samples may have been contaminated by other hydrocarbon materials, and, the other hydrocarbon materials might have produced a signal that would respond generally in the band gap of the asphaltenes, it is now known that the signals from most refined hydrocarbon materials are not effected by the presence of the materials which would be introduced with this method. Because of this phenomenon, it is now possible to distinguish electron spin resonance signals from crude oil from electron spin resonance signals from most refined products and, because it is possible to measure the amount of enhancement, it is possible to make a quantitative interpretation of the amount of hydrocarbon materials present in the sample.

We have further discovered a method for eliminating conflicting electron spin resonance signals from earth formation materials that can obscure the desired signal from petroleum crude. It is known that electron spin resonance signals from manganese falls in the same frequency range as the signals from petroleum crude. Furthermore, we have found that if manganese is present in an earth formation, it will be present in carbonate form. When measuring signals on an earth formation sample, if the signal from petroleum crude is weak, because only traces of crude are present, and if the formation contained carbonates, a signal from manganese may likely obscure the signal from the petroleum crude. In such a case, an acid wash of the subsurface earth formation will remove the carbonate and will remove the manganese with the carbonate. An acid wash with hydrochloric acid, or other suitable acids, will accomplish the desired result. The acid wash will not remove the petroleum crude, therefore electron spin resonance signals from the traces of crude will remain and, with the addition of the previously described iodine solution, will be enhanced.

In the copending application of S. W. Nicksic, Ser. No. 202,102, filed Oct. 30, 1980 there is a further disclosure of a procedure to provide additional evidence of the origin of electron spin resonance signals as derived from petroleum crude. In that application, it is shown that petroleum crude electron spin resonance signals will be suppressed when the petroleum crude is subjected to the presence of ferric chloride. Ferric chloride may be applied in a solution of benzene, toluene, xylene or carbon tetrachloride. Applying that disclosure to the present invention, it is possible to have a further well logging step for positively identifying electron spin resonance signals as signals from petroleum crude. That is, signals that were enhanced by the presence of iodine, will be suppressed by the presence of ferric chloride and if both enhancement and suppression occur, there is substantially conclusive evidence that the signals are from petroleum crude. The well logging method of the present invention may more conclusively resolve that petroleum crude is or was present in the earth formation sample.

FIGS. 3 and 4 illustrate electron spin resonance signals from crude oils (FIG. 3) and from refined products (FIG. 4). As illustrated in FIG. 3, the electron spin resonance signal 40 is a signal from crude oil materials deposited on an earth formation sample. This signal has an illustrated height h, representing the maximum positive and negative swing of the signal as the sample is subjected to an increasing frequency. Signal 41 represents the signal from the same sample measured after the sample has been subjected to a solution of iodine materials and illustrates the enhancement of the signal due to the presence of the iodine. In this case, the signal has an amplitude represented by letter H. The signals shown in FIG. 3 are portions of actual signals measured from crude oil in an earth formation sample.

FIG. 4 represents an electron spin resonance signal 42 measured from a refined hydrocarbon product and the same signal 43 measured from the same refined product with the addition of a solution of iodine materials. It should be noted that little, if any, enhancement has occurred in the signal from the refined product. The curves of FIG. 4 are actual curves measured on refined products.

While a certain preferred method of performing the invention has been specifically disclosed, it should be understood that the invention is not limited thereto as many variations will be readily apparent to those skilled in the art and the invention is to be given its broadest possible interpretation within the terms of the following claims.

What is claimed is:

1. A logging method for identifying the presence of crude petroleum within a subsurface earth formation from within a well bore penetrating said earth formation comprising the steps of:
   (a) measuring first electron spin resonance signals from asphaltene and resin constituents of crude petroleum within said earth formations along said well bore;
   (b) recording said measured signals with respect to vertical depth within said earth formation along said well bore;
   (c) treating said earth formation along said well bore with a material that effects the electron spin resonance signals from said asphaltene and resin constituents of crude petroleum;
   (d) taking a second measurement of said electron spin resonance signals from said asphaltene and resin constituents of crude petroleum within said earth formation along said well bore;
   (e) recording said second measurement of electron spin resonance signals with respect to the same dimensions of said first recorded signals; and
   (f) identifying the presence of crude petroleum within said earth formation along said well bore by the indication of effect on said electron spin resonance signals attributable to said treatment of step (c).

2. The method of claim 1 wherein the measured electron spin resonance signals are from asphaltene and resin constituents of crude petroleum, wherein the effect on said signal is an enhancement and said enhancement identifies the presence of crude petroleum containing said asphaltenes and resins.

3. The method of claim 1 wherein the introduced material is a material that removes the effect of earth formation materials on said electron spin resonance signal and said second measurement signal is an enhancement over said first measurement signal.

4. The method of claim 3 wherein the earth formation material whose effect is removed is manganese.

5. The method of claim 1 wherein the introduced material is a material that enhances said electron spin resonance signal from crude petroleum.

6. The method of claim 5 wherein said introduced material is a halogen.

7. The method of claim 6 wherein said halogen is iodine.

8. The method of claim 7 wherein said iodine is introduced in solution and said solution is forced into said earth formation along said well bore.

9. The method of claim 1 wherein said introduced material is a material that suppresses said electron spin resonance signal from crude petroleum.

10. The method of claim 9 wherein said introduced material is ferric chloride.

11. The method of claim 10 wherein said ferric chloride is in solution from the group including benzene, toluene, xylene or carbon tetrachloride.

12. The method of claim 1 wherein said material added in step (c) of claim 1 enhances said electron spin resonance signal and with the addition of the steps of:
    (a) after measuring and comparing said first and second electron spin resonance signals, treating said earth formation along said well bore with a second material that causes suppression of electron spin resonance signals from constituents of crude petroleum;
    (b) taking a third measurement of electron spin resonance signals from said asphaltene and resin constituents of crude petroleum within said earth formation along said well bore;
    (c) recording said third measurement of electron spin resonance signals with respect to the same dimensions of said first and second recorded signals; and
    (d) identifying the presence of crude petroleum within said earth formation along said well bore by the indication of:
        (i) relative enhancement of said electron spin resonance signls after said first treatment with said material added in said step (c) of claim 1; and
        (ii) relative suppression of said electron spin resonance signals after said treatment with said second material.

13. The method of claim 12 wherein said material added in step (c) of claim 1 to enhance said electron spin resonance signal is iodine and wherein said second material added to suppress said electron spin resonance signal is ferric chloride in benzene.

* * * * *